(12) United States Patent
Bonny (10) Patent No.: US 9,388,892 B1
(45) Date of Patent: Jul. 12, 2016

(54) HYDROSTATIC TRANSAXLE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 292 days.

(21) Appl. No.: 14/204,865

(22) Filed: Mar. 11, 2014

Related U.S. Application Data

(60) Provisional application No. 61/776,522, filed on Mar. 11, 2013.

(51) Int. Cl.
F16D 31/02 (2006.01)
F16H 39/06 (2006.01)
F16H 61/4139 (2010.01)

(52) U.S. Cl.
CPC ............ *F16H 39/06* (2013.01); *F16H 61/4139* (2013.01)

(58) Field of Classification Search
CPC .................................. F16H 61/4139
USPC ........................................... 60/488
See application file for complete search history.

(56) References Cited

U.S. PATENT DOCUMENTS

| | | | |
|---|---|---|---|
| 1,197,789 A | 9/1916 | Bluemel | |
| 3,199,376 A | 8/1965 | De Lalio | |
| 3,360,933 A * | 1/1968 | Swanson | F16H 61/40 60/488 |
| 3,765,258 A | 10/1973 | Jespersen | |
| 4,366,671 A * | 1/1983 | Chichester | F16H 61/423 60/488 |
| 5,311,740 A | 5/1994 | Shiba et al. | |
| 5,555,727 A | 9/1996 | Hauser et al. | |
| 5,819,535 A * | 10/1998 | Smothers | F16H 61/4139 60/488 |
| 6,125,954 A | 10/2000 | Oota et al. | |
| 6,312,354 B1 | 11/2001 | Irikura et al. | |
| 6,487,857 B1 | 12/2002 | Poplawski et al. | |
| 6,971,233 B1 | 12/2005 | Holder | |
| 7,007,468 B1 | 3/2006 | Bennett et al. | |
| 7,987,669 B2 * | 8/2011 | Irikura | F16H 61/423 60/488 |
| 8,348,637 B2 | 1/2013 | Heitzler et al. | |
| 8,393,236 B1 | 3/2013 | Hauser et al. | |
| 8,464,610 B1 * | 6/2013 | Langenfeld | F16H 39/06 74/606 R |
| 8,528,325 B1 | 9/2013 | Hauser | |
| 9,194,473 B1 * | 11/2015 | Hauser | B60T 1/062 |

FOREIGN PATENT DOCUMENTS

JP 2001318611 A 11/2001

* cited by examiner

*Primary Examiner* — Michael Leslie
(74) *Attorney, Agent, or Firm* — Neal, Gerber & Eisenberg LLP (57) ABSTRACT

A hydrostatic transaxle for use as a drive apparatus of a vehicle is provided. The hydrostatic transaxle includes a main housing joined to a gear housing to enclose a hydrostatic transmission and a reduction gear set. The hydrostatic transmission includes an axial piston pump assembly and an axial piston motor assembly arranged in a parallel configuration on one side of a center section. A charge pump is contained within a pocket on an opposing side of the center section. A charge pump cover assembly secures the charge pump in the pocket and has a charge relief assembly that extends into a void volume defined by a ring gear of the gear reduction set. The gear reduction set drives an axle extending from the gear housing.

20 Claims, 8 Drawing Sheets

HYDROSTATIC TRANSAXLE

CROSS-REFERENCE TO RELATED APPLICATION

This application claims priority to U.S. Provisional Patent Application No. 61/776,522, filed on Mar. 11, 2013, the contents of which are fully incorporated herein by reference.

BACKGROUND OF THE INVENTION

This application relates to hydrostatic transaxles generally, and in particular to hydrostatic transaxles having a center section assembly that includes a charge pump.

SUMMARY OF THE INVENTION

A hydrostatic transaxle for use as a drive apparatus of a vehicle is disclosed herein. The hydrostatic transaxle includes a main housing joined to a gear housing to enclose a hydrostatic transmission and a reduction gear set. The hydrostatic transmission includes an axial piston pump assembly and an axial piston motor assembly arranged in a parallel configuration on one side of a center section. A gerotor charge pump is contained within a pocket on an opposing side of the center section. A charge pump cover assembly secures the gerotor charge pump in the pocket and has a charge relief assembly that extends into a void volume defined by a ring gear of the gear reduction set. The gear reduction set drives an axle extending from the gear housing.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. In certain cross-sectional views, not all elements such as shafts are cross-hatched, where such cross-hatching would not assist in the understanding of the disclosure. This specification is intended to be taken as a whole and interpreted in accordance with the principles of the invention as taught herein and understood by one of ordinary skill in the art. All commonly-owned patents cited within this specification are expressly incorporated by reference herein.

Figure 1:
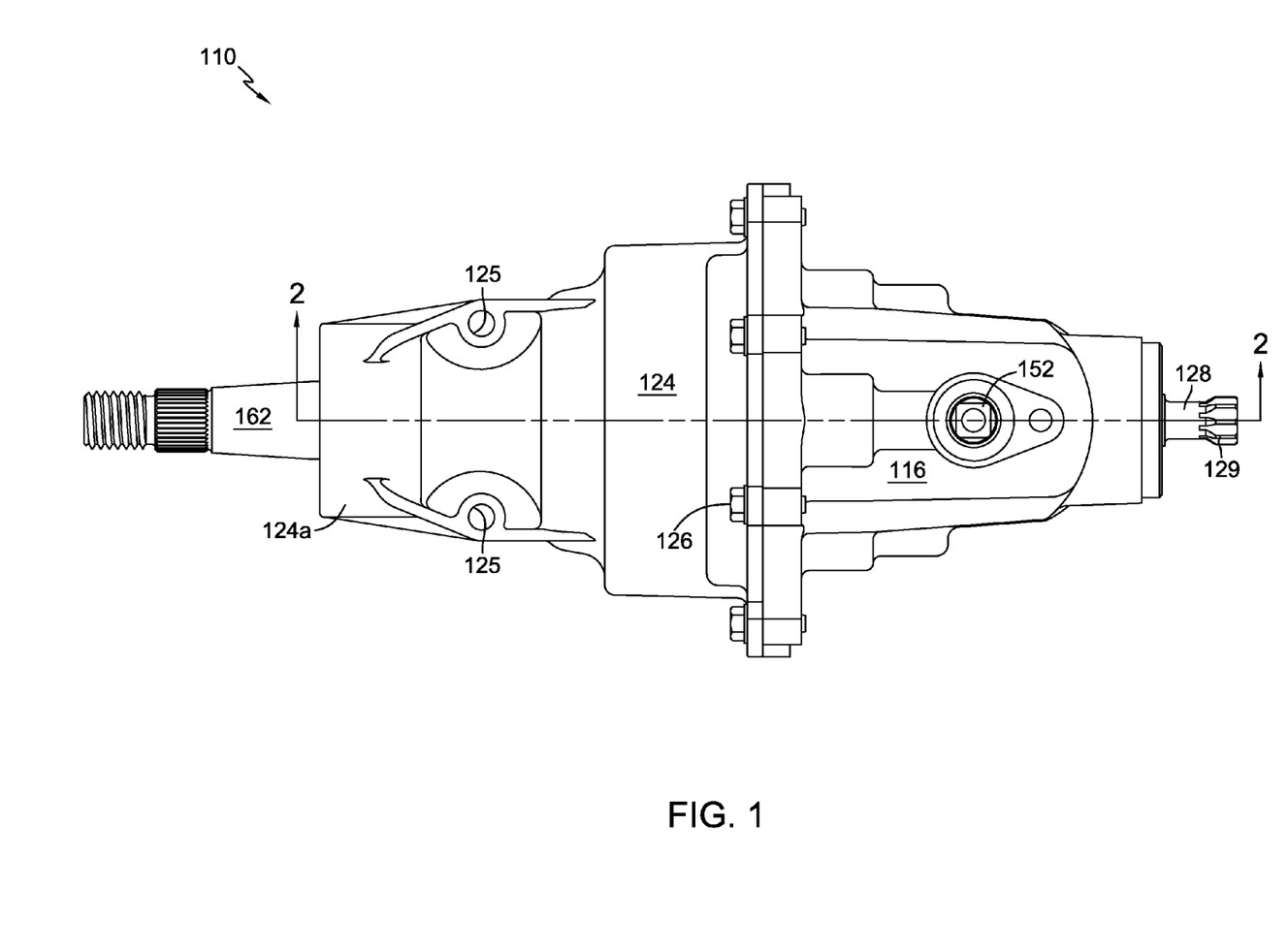
FIG. 1 is a plan view of an embodiment of a hydrostatic transaxle in accordance with the principles of the invention.

FIG. 1 shows a hydrostatic transaxle 110 having a first housing member and a second housing member, namely main housing 116 with gear housing 124 fastened thereto by fasteners 126, to form a sump 161. Gear housing 124 has a plurality of mounting holes 125 by which hydrostatic transaxle 110 may be fastened to a vehicle frame (not shown). An optional return to neutral assembly (not shown) which acts on trunnion arm 152, can be mounted in part on trunnion arm 152 and main housing 116. For example, a scissor-arm return to neutral mechanism, as illustrated in commonly-owned U.S. Pat. No. 6,487,857, incorporated by reference herein, could be used and will not be discussed further. Pump input shaft 128 has male splines 129 at the distal end thereof, that may be provided with a rounded or tapered profile to provide a flexible joint that negates the effect of vehicle frame flexion (e.g., when engaged to a drive shaft).

One application for transaxle 110 is in combination with a modular drive assembly such as that disclosed in commonly owned U.S. Pat. No. 8,393,236 and U.S. Pat. No. 9,194,473, the terms of which are incorporated herein by reference. FIGS. 2-10 show internal components of hydrostatic transaxle 110, including transmission assembly 114 comprising input shaft 128, pump assembly 132, center section 140, motor assembly 136, and motor output shaft 146. Pump assembly 132 and motor assembly 136 are arranged in a parallel configuration on one side of center section 140. The rotation of input shaft 128 is supported by bearing 160. Input shaft 128 is additionally supported by input shaft bearing surface 140e of center section 140. Center section 140 is attached to main housing 116 by fasteners 144 extending through mounting holes 140j. Center section 140 has integral hydraulic porting, namely fluid passages 142, pump kidney ports 140c, and motor kidney ports 140d to allow circulation of hydraulic fluid in a closed loop from pump assembly 132 to motor assembly 136. Center section 140 also has motor shaft bearing surface 140f to support motor shaft 146.

Figure 4:
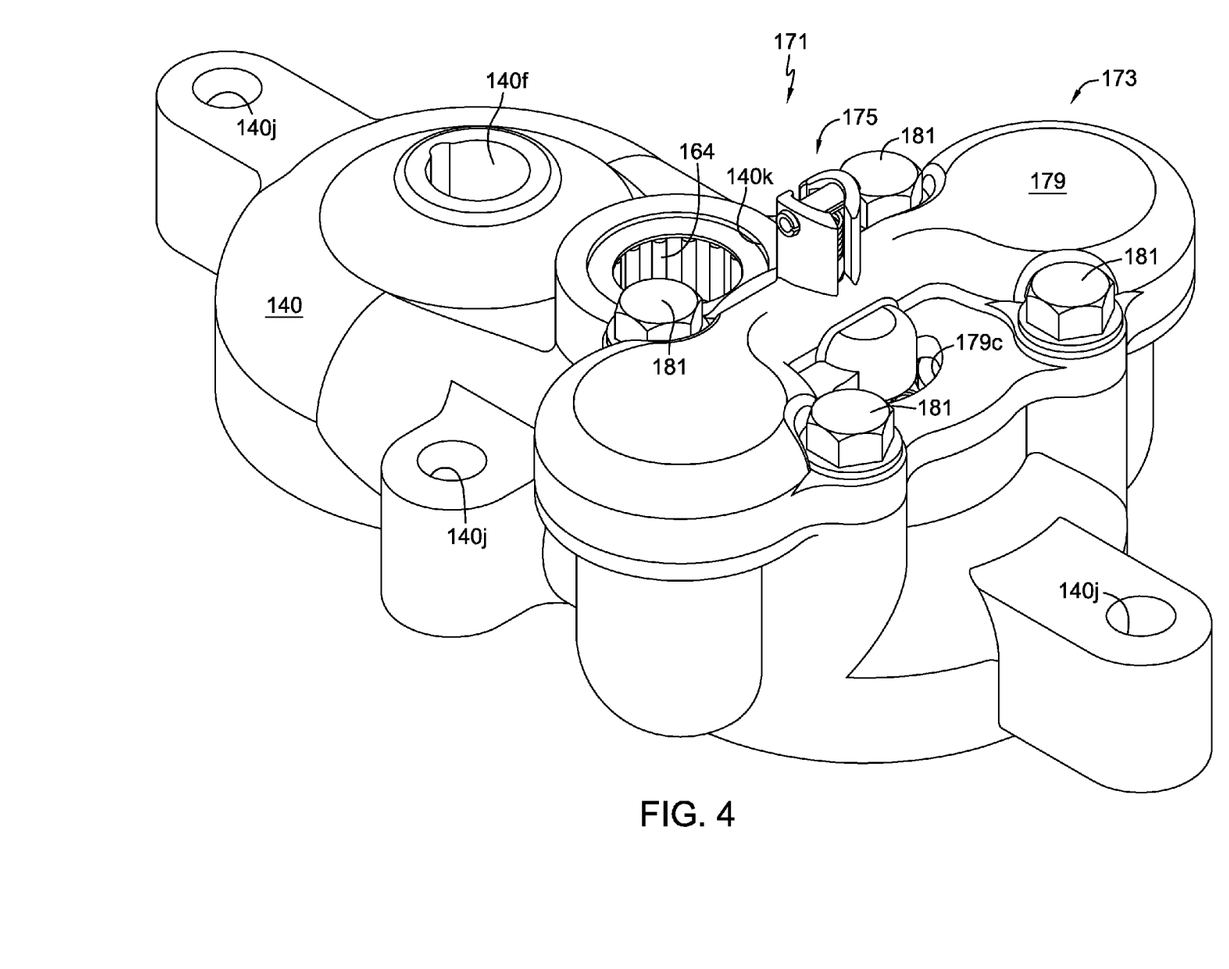
FIG. 4 is a perspective view of a center section assembly of the hydrostatic transaxle shown in FIG. 1.
Figure 5:
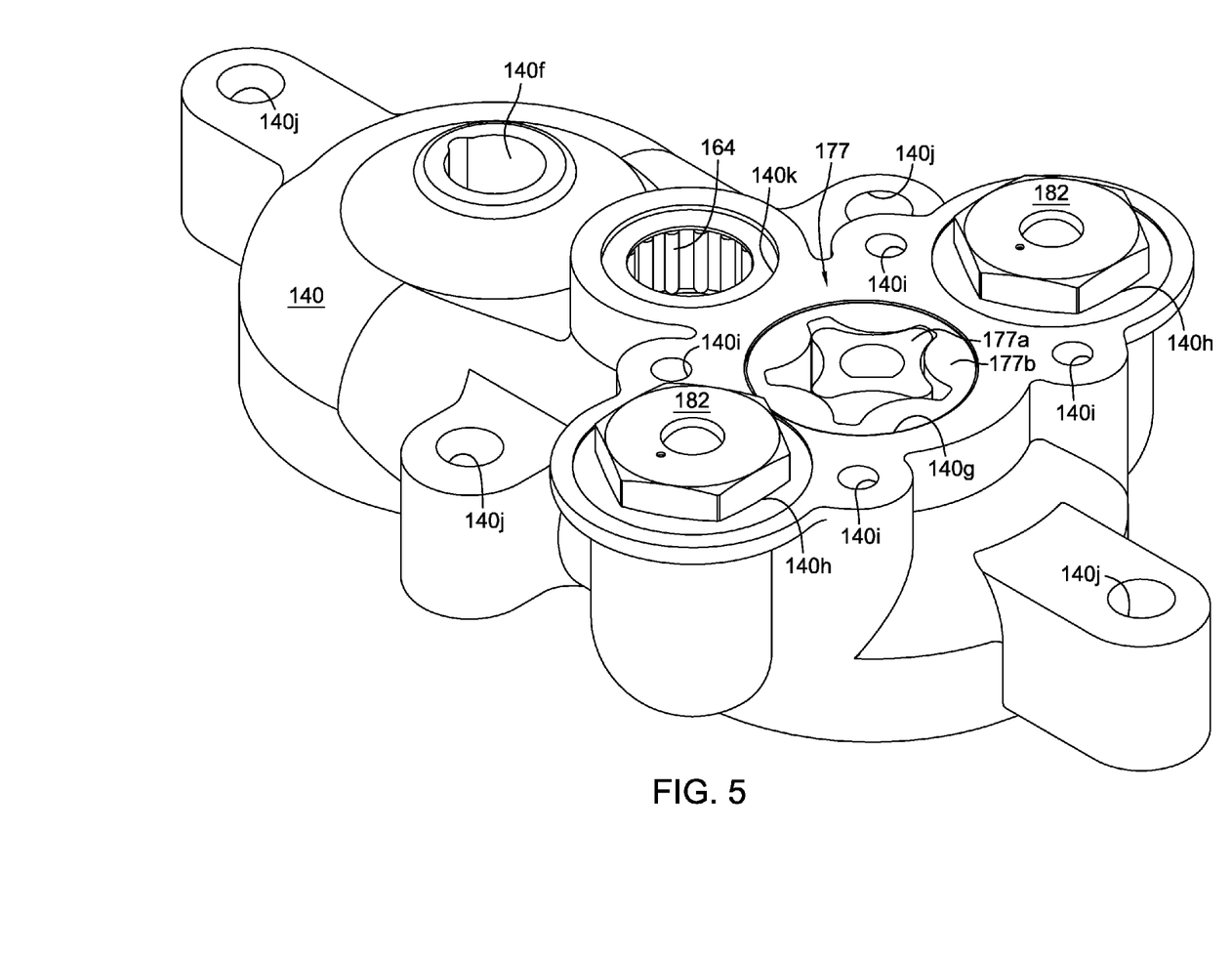
FIG. 5 is a perspective view of the center section assembly shown in FIG. 4 with a cover assembly removed for clarity.
Figure 6:
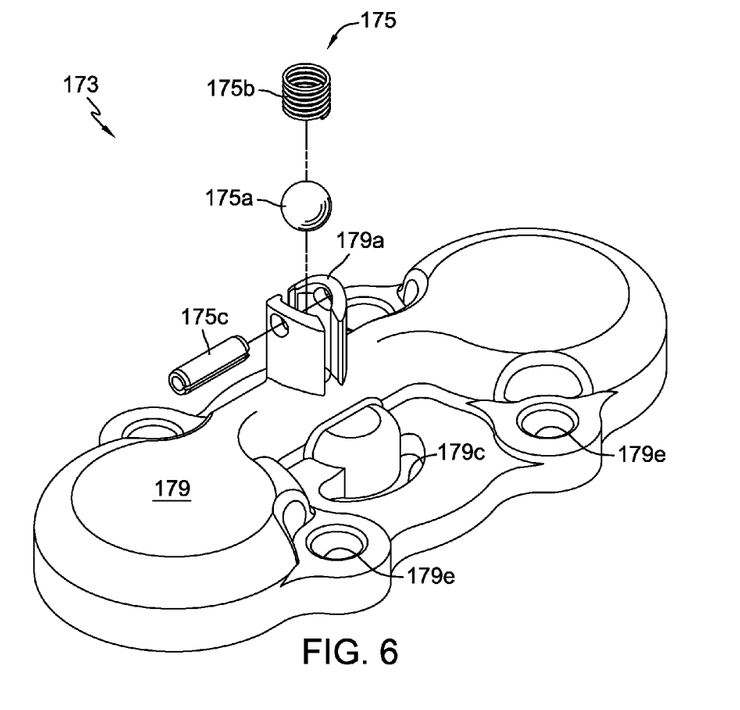
FIG. 6 is an exploded perspective view of the cover assembly shown in FIG. 4, with additional components removed for clarity.

Center section assembly 171, best seen in FIGS. 4 and 5, includes gerotor charge pump assembly 177 retained in pocket 140g of center section 140 by charge pump cover assembly 173. Gerotor charge pump assembly 177 is composed of outer rotor 177b and inner rotor 177a, which is driven by pump input shaft 128 by means of D-interface 177c that mates with D-interface 128a at the proximal end of pump input shaft 128. Charge pump cover 179, best seen in FIGS. 6 and 7, has mounting holes 179e which allow it to be secured to center section 140 by fixing fasteners 181 in mounting holes 140i. Charge pump cover 179 also has charge pump inlet 179c which allows hydraulic fluid to be drawn from sump 161 into charge gallery 179d by gerotor charge pump assembly 177. Charge gallery 179d comprises a pair of internal volumes, or ears 179h at opposite ends thereof and connected by a center passage 179i, each ear 179h being adjacent one of the check valve 182. Hydraulic charge fluid then flows into whichever of check valves 182, fixed in check valve ports 140h of center section 140, is in communication with the low pressure side of the hydraulic circuit. If trunnion arm 152 is in a neutral position, there will be no low pressure side and thus, no demand for make-up hydraulic fluid. To provide relief when necessary, charge pump cover assembly 173 includes a charge relief passage 179b formed in center passage 179i, and charge relief assembly 175 comprising ball 175a pressing against spring 175b, both of which are retained in charge relief tower 179a by pin 175c.

Figure 2:
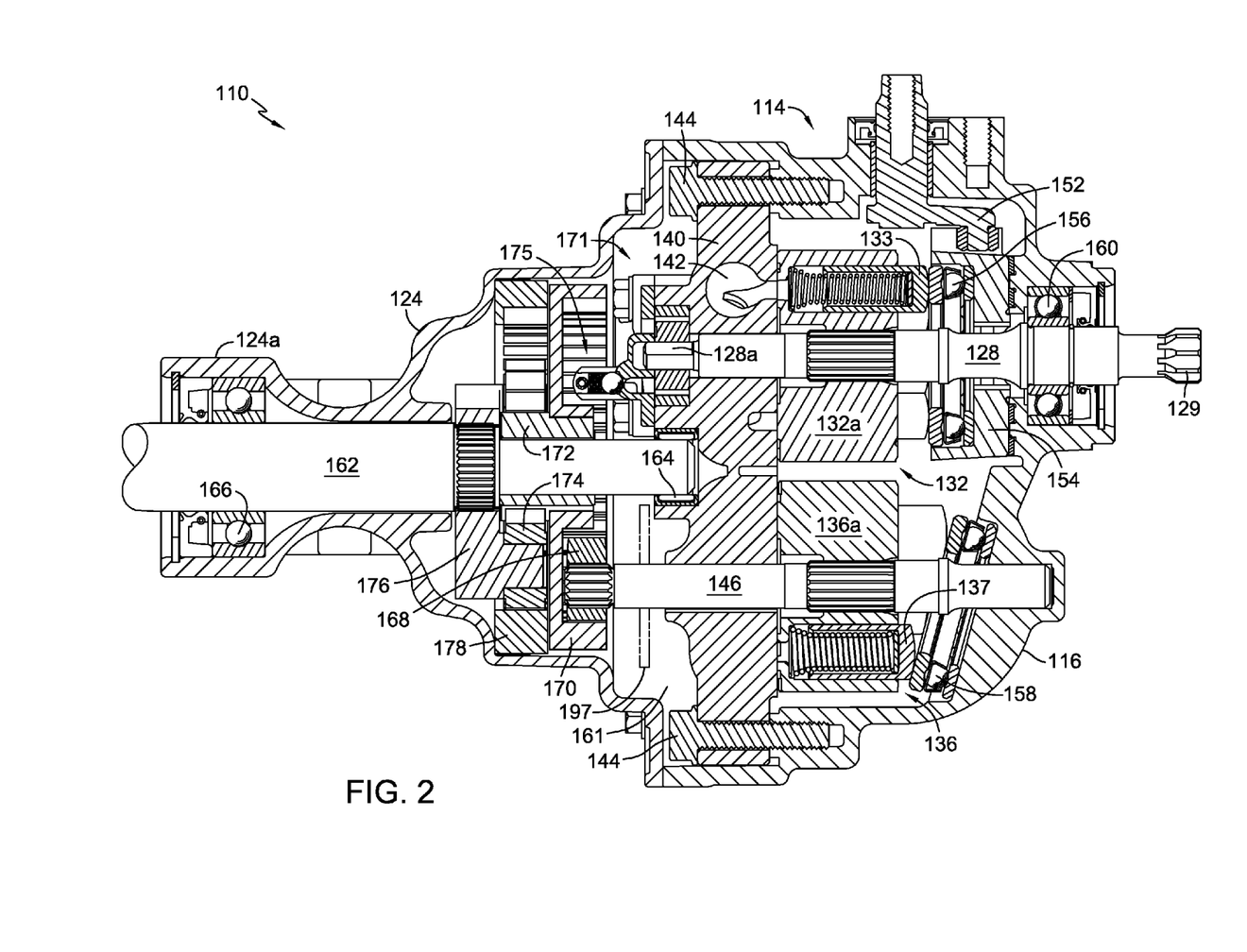
FIG. 2 is a partial cross-section of the hydrostatic transaxle shown in FIG. 1, taken along line 2-2.
Figure 3:
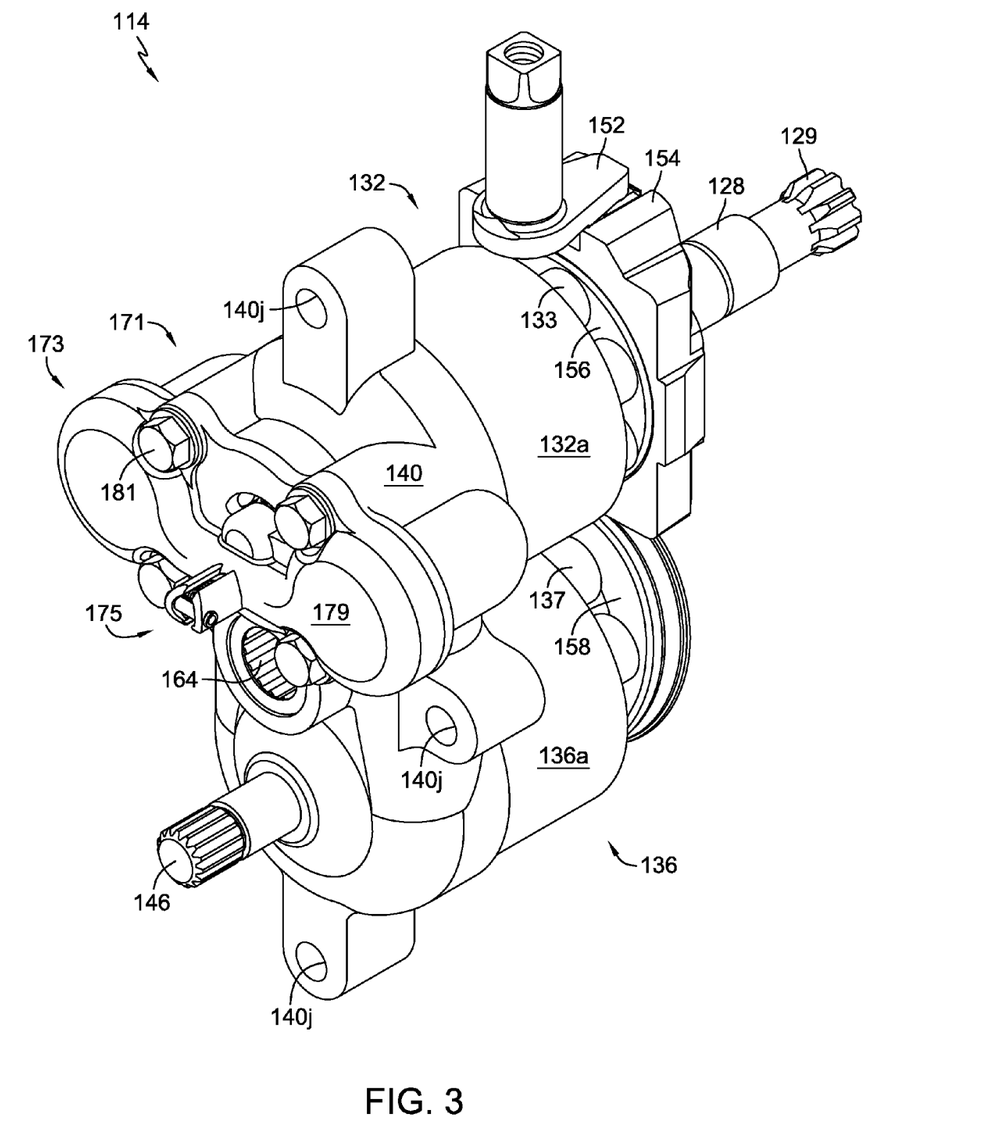
FIG. 3 is a perspective view of a hydrostatic transmission assembly of the hydrostatic transaxle shown in FIG. 1.

At least a portion of charge relief assembly 175 is disposed in the internal void volume formed by ring gear 170 as shown in, e.g., FIG. 2, and charge relief tower 179a extends in an axial direction that is parallel to the axis of rotation of input shaft 128. When trunnion arm 152 is in a neutral position, the force of spring 175b is overcome by hydraulic pressure in charge gallery 179d and hydraulic fluid passes from charge gallery 179d through charge relief passage 179b and into sump 161. Charge pump cover 179 also has mating surface 179f which contacts center section 140 and input shaft clearance pocket 179g to allow clearance of pump input shaft 128 with respect to charge pump cover 179. In the embodiment depicted, charge pump inlet 179c is disposed on one side of the clearance pocket 179g and center passage 179i is disposed on a second side of the clearance pocket 179g opposite the first side.

Figure 7:
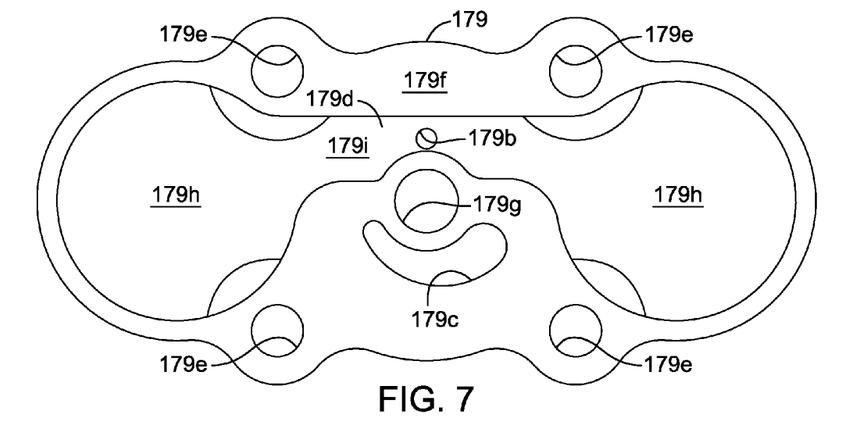
FIG. 7 is a bottom plan view of the opposing side of the cover assembly shown in FIG. 6, rotated about its long axis from the view illustrated in FIG. 6.
Figure 8:
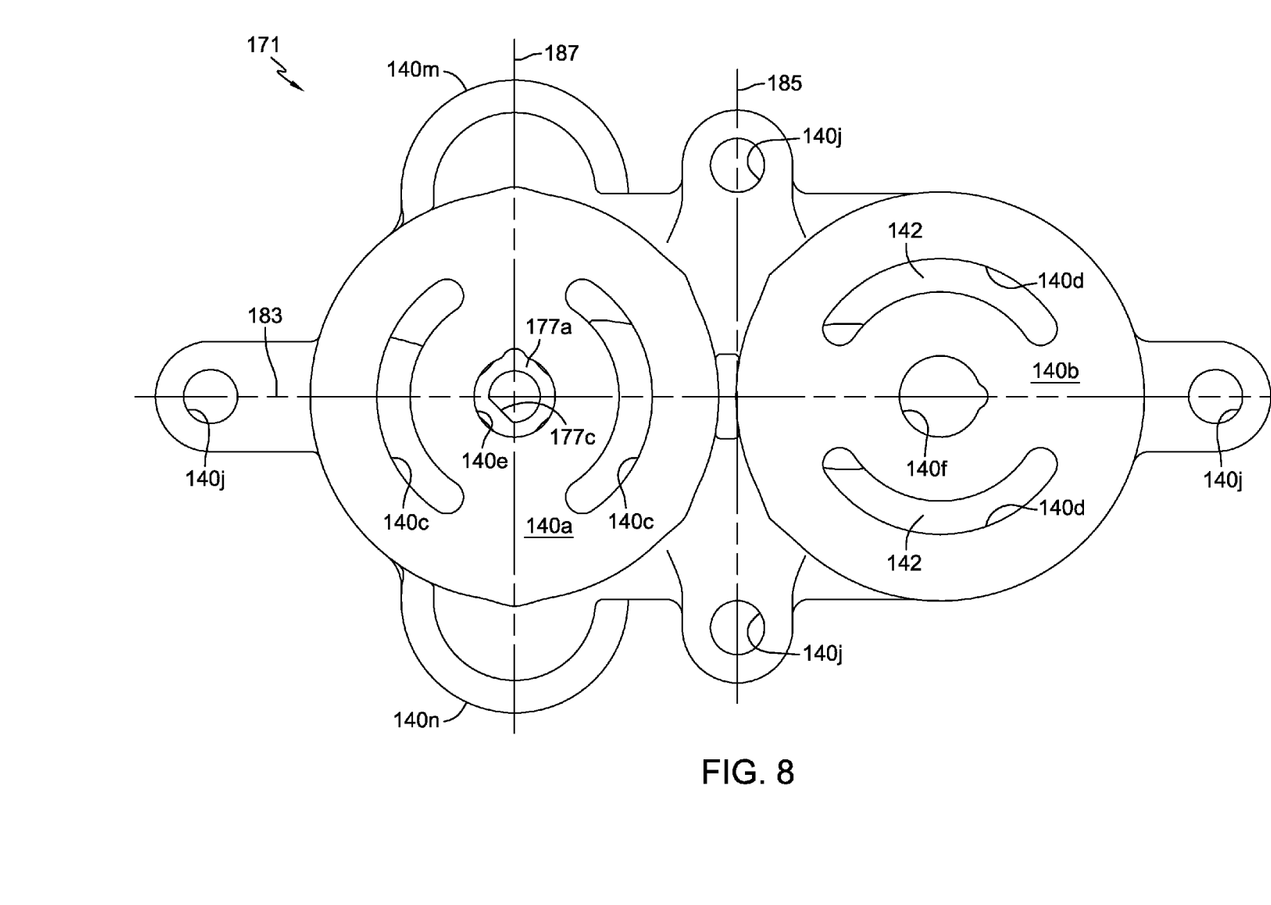
FIG. 8 is a plan view of the opposing side of the center section assembly shown in FIG. 4 rotated about its long axis from the view illustrated in FIG. 4.
Figure 9:
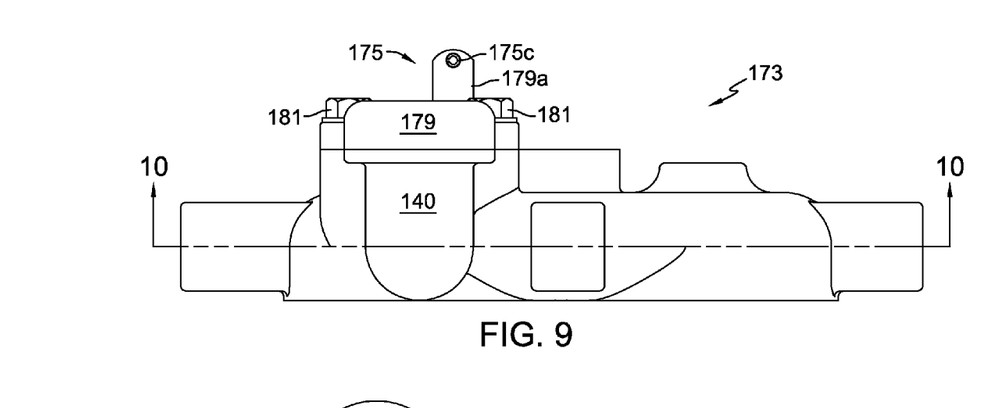
FIG. 9 is a side view of the center section assembly shown in FIG. 4.
Figure 10:
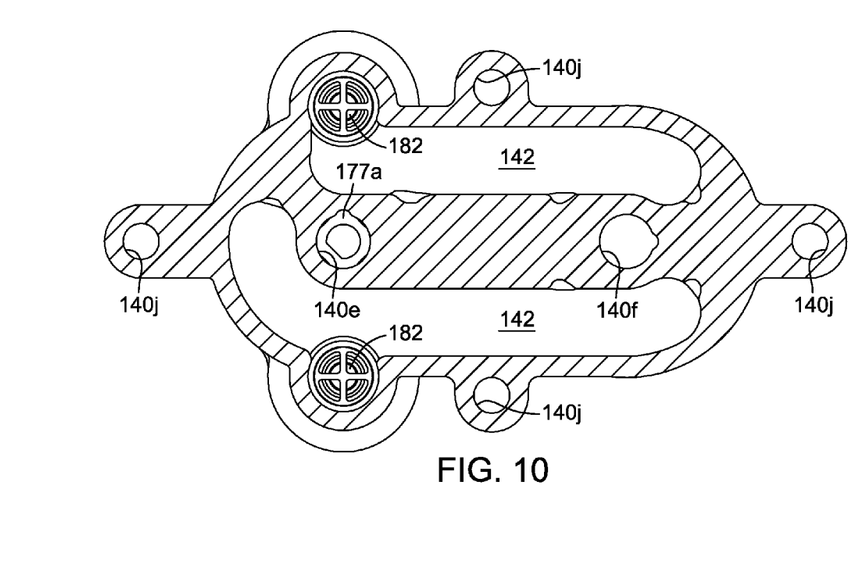
FIG. 10 is a cross-section of the center section assembly shown in FIG. 9, taken along line 10-10.

As seen most clearly in FIG. 8, the centers of the openings for pump input shaft 128, motor output shaft 146, and axle shaft 162, and thus the respective axes of rotation of these shafts, lie in a common plane 183 to minimize size of center section 140. In the embodiment depicted, the centers of two of the mounting openings 140j lie in this same plane 183, whereas the centers of two of the other mounting openings 140j lie in a second plane 185 perpendicular to plane 183. A pair of generally curved projections 140m and 140n extend out from center section 140, corresponding to the ears 179h in charge pump cover 179. Center passage 179i extends in a direction generally perpendicular to plane 183, as seen in FIG. 7, and the center of ears 179h along with the center of the opening in which pump shaft bearing surface 140e is disposed (i.e., the axis of rotation of pump shaft 128) lie in a third plane 187 parallel to second plane 185.

For adjusting the output of hydrostatic transaxle 110, swash plate 154 is in contact with pump thrust bearing 156 against which pump pistons 133 travel as shown in FIG. 2. The direction of rotation of pump cylinder block 132a is fixed by the direction of rotation of input shaft 128, to which pump cylinder block 132a is non-rotatably joined. Pump cylinder block 132a runs on pump running surface 140a, shown in FIG. 8. As will be understood by those of ordinary skill in the art, swash plate 154 may be moved to a variety of positions to vary the displacement of pump pistons 133, the corresponding rotational speed and direction of rotation of motor cylinder block 136a, running on motor running surface 140b of center section 140, and the corresponding output of motor shaft 146. Motor pistons 137 move against motor thrust bearing 158 which is set at a fixed, non-neutral angle of displacement. Movement of the swash plate 154 is accomplished by operator controlled movement of trunnion arm 152 by a control linkage (not shown). Rotation of trunnion arm 152 causes swash plate 154 to swing either fore or aft through an arc to effect displacement of pump pistons 133.

Generally, as the angle of swash plate 154 is varied in one direction from the neutral position, the stroke of the pump pistons 133 is varied, which then drives the motor assembly 136 at a speed determined by the volume of the fluid displaced by the pump pistons 133. As the angle of the swash plate 154 is decreased to pass through the neutral position, the direction of rotation of motor assembly 136 and its corresponding motor output shaft 146 is reversed. The speed of the motor is again determined by the volume of fluid displaced by the pump pistons 133.

Axle shaft 162 is rotationally supported by inner axle bearings 164, set in bearing pocket 140k of center section 140, and outer axle bearings 166. Outer axle bearings 166 are supported by bearing support structure 124a of gear housing 124. To drive axle shaft 162, reduction gearing is provided to couple axle shaft 162 to motor shaft 146, imparting thereto an appropriate speed and torque. Thus, the proximal end of motor shaft 146 is splined to pinion gear 168 which drives ring gear 170. Ring gear 170 in turn drives sun gear 172 which drives planet gears 174. Because the planetary ring gear 178 is held stationary, the planet gears 174 drive planet gear carrier 176 which is splined to axle shaft 162. Other known reduction schemes may be employed to impart an appropriate speed and torque to axle shaft 162. An optional brake rotor 197 can be fixed to motor shaft 146 to provide braking capability if additional brake components (not shown) are also included. As shown most clearly in FIG. 2, the interior or proximal end of axle shaft 162 adjacent bearing 164 is therefore partially disposed within center section 140, and it extends past the proximal end of pump input shaft 128 and also past the proximal end of motor shaft 146 that engages pinion gear 168. All three shafts 128, 146 and 162 therefore overlap to form a more compact unit.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:
1. A transaxle comprising:
   a main housing having disposed therein an axial piston pump driven by a pump input shaft, an axial piston motor with a motor output shaft, and a center section assembly, said center section assembly comprising:
   a center section having a pump running surface and a motor running surface on a first side, a pocket formed on a second side opposite the first side and porting formed therein to connect the pump running surface to the motor running surface;
   a charge pump disposed in the pocket and driven by the pump input shaft;
   a charge pump cover disposed over said pocket, said charge pump cover having an external surface, an internal surface defining a charge gallery and a charge relief passage through said charge pump cover; and a charge relief tower extending from the external surface of the charge pump cover and communicating with the charge relief passage, said charge relief tower having a charge relief assembly fixed thereto;

a gear housing fastened to said main housing; and a reduction gear set disposed in the gear housing and comprising a pinion gear driven by the motor output shaft and driving a ring gear, said reduction gear set driving an axle, wherein said charge relief tower extends into a void volume defined by the circumference of said ring gear.

2. The transaxle of claim 1, further comprising a second pocket formed in the second side of the center section to support an end of the axle in the second side of the center section.

3. The transaxle of claim 2, wherein the charge pump cover further comprises a clearance pocket to allow clearance of the pump input shaft with respect to the charge pump cover.

4. The transaxle of claim 1, wherein the charge gallery is comprised of two internal volumes disposed between the charge pump cover and the second side of the center section, and a center passage extending between the two internal volumes, wherein the center passage extends in a direction that is generally perpendicular to a plane formed by the axes of rotation of the pump input shaft and the motor output shaft.

5. The transaxle of claim 4, further comprising a first check valve and a second check valve extending into the center section from the second side thereof to permit hydraulic fluid to enter the porting, wherein the first check valve is disposed adjacent one of the two internal volumes and the second check valve is disposed adjacent the other of the two internal volumes.

6. The transaxle of claim 4, wherein the charge relief passage is disposed in the center passage.

7. The transaxle of claim 4, wherein the gear housing and the main housing form a common sump for the pump, the motor and the reduction gear set, and the charge pump cover further comprises a charge pump inlet extending through the charge pump cover to permit hydraulic fluid to flow from the common sump to the charge pump.

8. The transaxle of claim 7, wherein the charge pump cover further comprises a clearance pocket to allow clearance of the pump input shaft with respect to the charge pump cover, and the charge pump inlet is disposed on one side of the clearance pocket and the center passage is disposed on a second side of the clearance pocket opposite the first side.

9. A center section assembly for a hydrostatic transmission having a pump driven by a pump input shaft and a motor driving a motor output shaft, the center section assembly comprising:

a center section having a pump running surface and a motor running surface formed on a first side thereof, and a pocket for a charge pump formed on a second side thereof, opposite the first side;

a charge pump cover engaged to the center section and disposed over said pocket, said charge pump cover having an internal surface defining a charge gallery;

a charge relief passage in communication with the charge gallery and extending through said charge pump cover; and a charge relief tower extending from an external surface of said charge pump cover and communicating with the charge relief passage, said charge relief tower having a charge relief valve disposed therein to permit hydraulic fluid to discharge from the charge relief passage into a sump.

10. The center section assembly of claim 9, further comprising a second pocket to support an end of an axle in the second side of the center section.

11. The center section assembly of claim 9, wherein the charge pump cover further comprises a clearance pocket to allow clearance of the pump input shaft with respect to the charge pump cover.

12. The center section assembly of claim 11, wherein the charge gallery is comprised of two internal volumes disposed between the charge pump cover and the second side of the center section, and a center passage extending between the two internal volumes, wherein the center passage extends in a direction that is generally perpendicular to a plane formed by the axes of rotation of the pump input shaft and the motor output shaft.

13. The center section assembly of claim 12, further comprising a first check valve and a second check valve extending into the center section from the second side thereof to permit hydraulic fluid to enter the porting, wherein the first check valve is disposed adjacent one of the two internal volumes and the second check valve is disposed adjacent the other of the two internal volumes.

14. A drive apparatus, comprising:

a first housing member joined to a second housing member to form an internal sump;

a transmission disposed in the internal sump and comprising a pump driven by a pump input shaft, a motor driving a motor output shaft, and a center section having a pump running surface on which the pump is rotatably disposed and a motor running surface on which the motor is rotatably disposed, wherein the pump running surface and the motor running surface are located on a first side of the center section and are connected by means of hydraulic porting formed in the center section;

a first check valve and a second check valve disposed in the center section on a second side thereof, opposite the first side;

a charge pump is disposed on the second side of the center section and driven by the pump input shaft;

a charge pump cover mounted to the second side of the center section and disposed over the charge pump, the charge pump cover having an external surface and an internal surface defining a charge gallery comprising a first internal volume located adjacent the first check valve, a second internal volume adjacent the second check valve, a center passage connecting the first internal volume with the second internal volume, and a charge relief passage through said charge pump cover at the center passage to permit hydraulic fluid to be exhausted from the charge gallery to the internal sump; and a reduction gear set disposed in the internal sump and comprising a pinion gear driven by the motor output shaft and driving a ring gear, an axle disposed in the second housing member and driven by the reduction gear set, one end of the axle extending out of the second housing member.

15. The drive apparatus of claim 14, further comprising a charge relief tower extending from the external surface of the charge pump cover and communicating with the charge relief passage, said charge relief tower having a charge relief assembly fixed thereto, wherein said charge relief tower extends into a void volume defined by the circumference of said ring gear.

16. The drive apparatus of claim 15, wherein the charge relief tower extends in an axial direction that is parallel to an axis of rotation of the pump input shaft.

17. The drive apparatus of claim 14, wherein the charge pump comprises a gerotor disposed in a pocket formed on the second side of the center section.

18. The drive apparatus of claim 14, wherein a second end of the axle is supported in the second side of the center section.

19. The drive apparatus of claim 14, wherein the charge pump cover further comprises a clearance pocket to allow clearance of the pump input shaft with respect to the charge pump cover.

20. The drive apparatus of claim 14, wherein the center passage extends in a direction that is generally perpendicular to a plane formed by the axes of rotation of the pump input shaft and the motor output shaft.

* * * * *